(No Model.)
W. S. JOHNSON.
ELECTRIC TELE-THERMOSCOPE.
No. 281,884. Patented July 24, 1883.
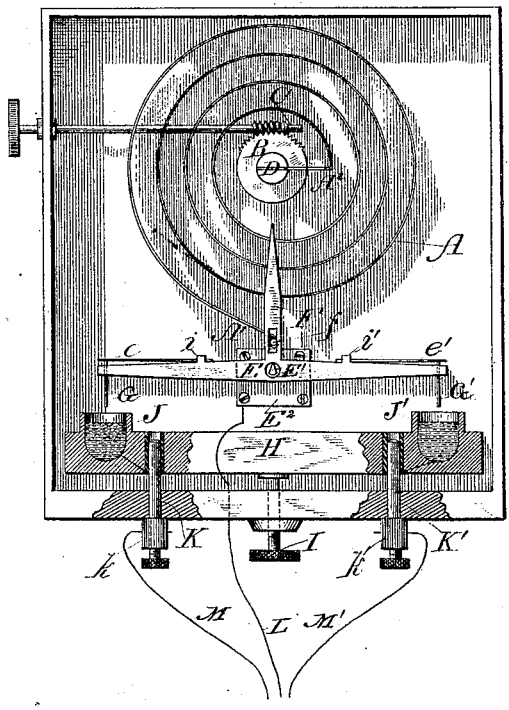
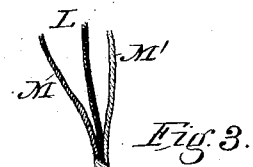
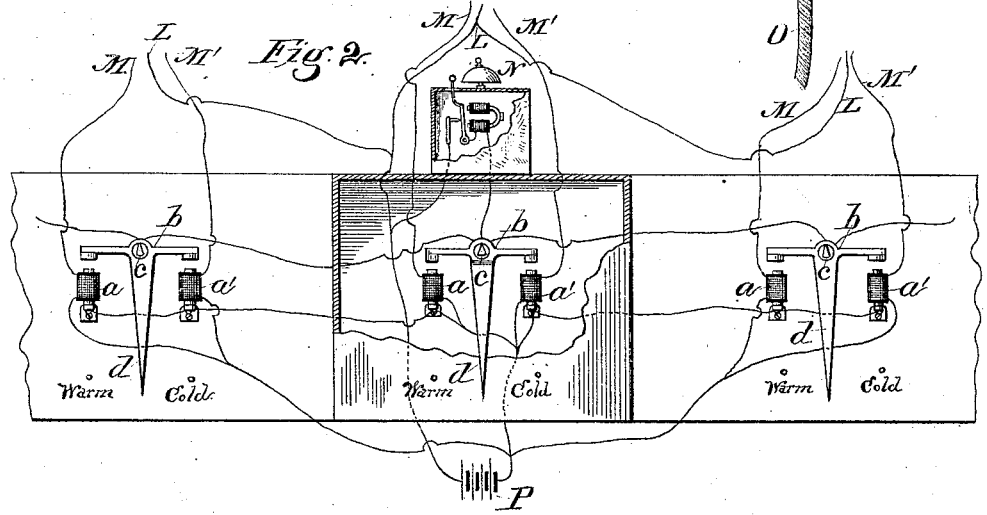
Witnesses:
Inventor:
Warren S. Johnson
By
Stout & Underwood
Attorneys.

UNITED STATES PATENT OFFICE.

WARREN S. JOHNSON, OF WHITEWATER, ASSIGNOR OF ONE-HALF TO WILLIAM PLANKINTON, OF MILWAUKEE, WISCONSIN.

ELECTRIC TELE-THERMOSCOPE.

SPECIFICATION forming part of Letters Patent No. 281,884, dated July 24, 1883.

Application filed April 3, 1883. (No model.)

*To all whom it may concern:*

Be it known that I, WARREN S. JOHNSON, of Whitewater, in the county of Walworth, and in the State of Wisconsin, have invented certain new and useful Improvements in Electric Tele-Thermoscopes; and I do hereby declare that the following is a full, clear, and exact description thereof.

My invention relates to devices adapted to indicate, at any convenient point, the relative temperature in rooms, conservatories, cellars, &c., situated at a point remote from the location of the indicators of my device; and it consists of certain peculiarities of construction, as will be more fully set forth hereinafter.

In the drawings, Figure 1 represents a thermostatic transmitter located in the room whose changes in temperature are to be noted. Fig. 2 is a view of the indicators; and Fig. 3 is a detail of the conducting-wires which connect the parts just named.

A represents a coiled spring composed of thin strips of two or more metals of different expansibility soldered or otherwise firmly fastened together in such a manner that any change of temperature will cause one end of the spiral, as A', to move, providing that the other end, as A², is fixed. In the illustration given the coil is to be understood as having its most expansible metal on the outside—for instance, spring-brass for its outer portion and spring-steel for its inner lining, their ratios of expansion being in the neighborhood of 8 to 5. The end A² of the coil is fixed firmly to an axis, which bears a toothed wheel or lever, B, which is governed in its movements by the endless screw C. The toothed wheel or lever B is fixed firmly to the axis D, which holds the spring A. At the extremity A' of the spring is an oscillating beam, E, resting upon the "knife-edge" or other anti-friction point, E'. The oscillating beam E bears with it an index, F, which is slotted at $f'$, and within this slot a pin, $f$, plays, and as this pin $f$ is secured to the end A' of coil A the expansion or contraction of the coil will cause it (the pin $f$) to crowd the index either to the right or left, as the case may be, and the slot will allow sufficient vertical play of the pin to prevent any mechanical strain on the coil, which would tend to throw the two metals out of adjustment one with the other; and this is a very important feature of my invention, as the coils are very delicate and susceptible to strain. The oscillating beam E has at its extremities the needle-points G G', which project below. For the sake of accuracy the needle-points G G' are not attached rigidly to the beam E, but to the springs $e\ e'$, which are fastened at convenient points, as $i\ i'$, and these springs, like the slot in index F, serve to relieve the coils from strain, for if the points G G' were rigidly attached to the beam E, then, when such a temperature was reached as would cause one end of the beam to dip far enough for its point to strike the bottom of one of the mercury-cups, which are designed to receive them, there would be a strain sufficient to destroy the adjustment of the metals in the coil and render its registry inaccurate; but by attaching the points to the springs I avoid any liability of such mishap.

J J' are the mercury-cups for receiving the points G G'. They are seated in or upon a bar, H, of non-conducting material, and this bar rests upon a screw-bolt, I, by which it is adjusted vertically to vary the distance between the mercury and the points G G', so that a greater or less deflection of the beam E may take place before contact is made.

K K' are metallic posts, which are passed up through the bottom of the case of my apparatus and enter metal-lined holes in beam H, and not only serve to balance the beam, but make electrical connection with the mercury through small wires.

It is evident that any movemet of the end A' of the coil A will cause the beam E to take an oblique position, and, if the movement be great enough, to dip a needle-point into one or the other of the cups of mercury J J'. Supposing G and J to be the poles of a battery, when the needle-point G touches the mercury J the circuit will be closed. Under like conditions the same will be true of G' J'. It is also evident that if the bar H, bearing the cups J J', be raised by means of the thumb-screw I a smaller oscillation of the beam E will close the circuit. It will also be seen that if a time be selected when the room or other place where the instrument is situated is at the desired mean temperature the index-pointer F may be brought to a vertical position by means of the endless screw C, or the plate E², which carries the knife-edge fulcrum E, may be made movable, and the index-pointer adjusted from said fulcrum, though I prefer the way shown in the drawings.

Fig. 3 represents a section of the conducting-wires of the system. For convenience, three or more insulated wires are wound with an outside covering, O, to keep them in place; but, aside from this, each individual wire has some distinguishing mark, such as being wound with a different-colored insulating material, or covered or braided in different styles, by which the proper wires may be selected for attachment at a remote point—that is, the wires M L M' may be so marked as to be readily distinguished without trouble or electrical test; but these wires form no part of my invention.

Fig. 2 represents the indicators of the system. $a\,a'$ are electro-magnets, one of which, $a$, is in the circuit M L, and the other, $a'$, is in the circuit L M'. Above the electro-magnets $a\,a'$ is the oscillating armature $b$, resting upon the knife-edge or other anti-friction point, $c$, and bearing the index $d$. P represents the battery with which the conductors mentioned are connected. Supposing that the apparatus shown in Fig. 1 be connected, as shown, with that in Fig. 2, it will be seen that when the needle-point G touches the mercury J the electro-magnet $a$ will be in circuit, and will oscillate the armature $b$ and its index $d$. Should the most expansible metal of the coil A be upon the outside, as described, the contact will be made when the temperature is at the minimum, and the armature $b$ will be drawn down by the electro-magnet $a$, and hence the index $d$ will indicate the fact by pointing to "cold." On the contrary, should the temperature rise to the maximum, the contact will be formed at G' J', and the index $d$ will oscillate in the opposite direction and thus point to "warm." To call the attention of the attendant to the fact that the temperature has reached the said maximum or minimum, there is placed in a shunt or cross circuit the electric bell N. This circuit is closed by the movement of the armature $b$. In the construction shown in the drawings the core of either magnet $a\,a'$ and the armature $b$ will close the shunt-circuit when they come in contact.

In the foregoing I have described the action of a single indicator; but, as shown, these may be multiple, there being one indicator for every room or other place which is supplied with a thermostatic transmitter, and the cores of the electro-magnets of the central indicator (which bears the bell) are connected electrically with the cores of the electro-magnets of all the indices for the various rooms by wires, as shown in Fig. 2; or they may all be fastened to the same metallic plate. In like manner I connect all the armatures electrically, and by these means, whichever armature touches a core it will instantly ring the bell N, and thus call the attention of the attendant to the fact that there has been a maximum or minimum change of temperature in one of the rooms, and the particular index moved by its armature will at once indicate which room it is and whether it is too warm or too cold. A single battery, as P, may serve to generate the electricity for the various circuits.

I conduct my current directly through the cores of the magnets $a\,a'$ to the armature $b$, and through it to the signal-bell, (but of course to do this I must interpose a thin layer of demagnetic metal between the cores and armatures,) instead of through a separate contact-point; and therefore the armature and magnet will be so close to each other as to be held by a very slight current while the major portion of the current from the battery is ringing the bell. A thin layer of platinum laid over the cores will prevent them from adhering to the armature.

Having thus described my invention, what I claim as new, and desire to secure by Letters Patent, is—

1. In a thermostatic transmitter, the combination of the metallic thermometer A, provided with pin $f$ at its free end, and having its other end firmly fixed to the axis D of a toothed wheel, B, adjustable by screw C, with the oscillating beam E, bearing an index F, provided with a vertical slot for the reception of the pin $f$, substantially as set forth.

2. In a thermostatic transmitter, the combination of the metallic thermometer A and the oscillating beam E, having contact-points G G', and springs $e\,e'$, adapted to close electric circuits, substantially as set forth.

3. In a thermostatic transmitter, the combination of the metallic thermometer A, the index-arm F, and the adjusting-screw C and wheel B, substantially as set forth.

4. The beam H, having metal-lined holes, in combination with the posts K, and electrical connections with the mercury-cups and a battery, as set forth.

5. In a thermostatic transmitter, the combination of the oscillating beam E, having the contact-points G G', mercury-cups J J', in electric circuit with said points, and the adjusting mechanism H I, and posts K K, by means of which the mercury-cups J J' may be made to approach or recede from the points G G', substantially as set forth.

6. In a thermostatic transmitter, the combination of the metallic thermometer A, index-adjuster C B, index F, oscillating beam E, having contact-points G G', mercury-cups J J' in electric circuit with the contact points, and the adjusting device H I, substantially as set forth.

7. In a thermostatic transmitter or system of thermal telegraphy, the combination of a metallic thermometer attached to the axis of a toothed wheel, and adjustable by an endless screw, with oscillating beam and contact points, and bar H, bearing mercury-cups, and having movable or slide bearings adjustable by screw I, and an electro-magnetic indicator, by means of which the maximum and minimum points determined by the transmitter are shown at a remote point, substantially as set forth.

In testimony that I claim the foregoing I have hereunto set my hand, on this 27th day of March, 1883, in the presence of two witnesses.

WARREN S. JOHNSON.

Witnesses:
H. G. UNDERWOOD,
S. S. STOUT.